United States Patent
Kurauchi et al.

(10) Patent No.: US 9,537,402 B2
(45) Date of Patent: Jan. 3, 2017

(54) ELECTRIC POWER CONVERTER

(71) Applicant: DENSO CORPORATION, Kariya, Aichi-pref. (JP)

(72) Inventors: Syuji Kurauchi, Nagoya (JP); Tsuyoshi Hosoda, Okazaki (JP); Keisuke Yagyu, Kariya (JP)

(73) Assignee: DENSO CORPORATION, Kariya (JP)

( * ) Notice: Subject to any disclaimer, the term of this patent is extended or adjusted under 35 U.S.C. 154(b) by 105 days.

(21) Appl. No.: 14/710,881

(22) Filed: May 13, 2015

(65) Prior Publication Data

US 2015/0333636 A1 Nov. 19, 2015

(30) Foreign Application Priority Data

May 14, 2014 (JP) ................................. 2014-100244

(51) Int. Cl.
- *H02J 1/10* (2006.01)
- *H02M 3/28* (2006.01)
- *H02M 3/335* (2006.01)
- *H02J 7/00* (2006.01)

(52) U.S. Cl.
CPC .............. *H02M 3/285* (2013.01); *H02J 1/102* (2013.01); *H02M 3/33507* (2013.01); *H02J 7/0065* (2013.01)

(58) Field of Classification Search
CPC .......... H02J 1/102; H02M 7/08; H02M 7/493; H02M 3/1584; Y02B 70/126
USPC ................... 363/65, 69–72; 323/272; 307/82
See application file for complete search history.

(56) References Cited

U.S. PATENT DOCUMENTS

| | | | |
|---|---|---|---|
| 5,193,054 A * | 3/1993 | Galloway | H02J 4/00 307/82 |
| 6,262,901 B1 * | 7/2001 | Simopoulos | H02J 1/102 363/26 |
| 2004/0208029 A1 * | 10/2004 | Caruthers | G08C 19/00 363/72 |
| 2015/0222191 A1 | 8/2015 | Hosoda et al. | |

FOREIGN PATENT DOCUMENTS

| | | |
|---|---|---|
| JP | 2002-291247 | 10/2002 |
| JP | 2015-149815 | 8/2015 |

* cited by examiner

*Primary Examiner* — Nguyen Tran
(74) *Attorney, Agent, or Firm* — Nixon & Vanderhye PC

(57) ABSTRACT

An electric power converter is equipped with a master converter and a slave converter that are connected in parallel with each other, and to a load. The master converter operates having priority over the slave converter. The slave converter includes a voltage sensor for detecting an output voltage of the electric power converter and a control unit for controlling an output of the slave converter based on a target command value. The control unit selects a current command value Ic2 received from the master converter as a target command value when a variation $\Delta V$ per predetermined time of a detected output voltage Vo2 is lower than a variation $\Delta Vth1$. The control unit selects a voltage command value Vc2a calculated so as to suppress the output voltage Vo2 from changing as the target command value when the variation $\Delta V$ exceeds the variation $\Delta Vth1$.

6 Claims, 5 Drawing Sheets

ELECTRIC POWER CONVERTER

CROSS-REFERENCE TO RELATED APPLICATION

This application is based on and claims the benefit of priority from earlier Japanese Patent Application No. 2014-100244 filed May 14, 2014, the description of which is incorporated herein by reference.

TECHNICAL FIELD

The present disclosure relates to an electric power converter having a plurality of DC/DC converters that are connected in parallel to each other.

BACKGROUND

There is an apparatus as an electric power converter having a plurality of DC/DC converters that are connected in parallel to each other disclosed in Japanese Patent Application Laid-Open Publication No. 2002-291247.

In the apparatus according to the Publication No. '247, a series resistance with a resistance value R1 is connected between an output terminal of a first DC/DC converter (output voltage V1) and one of terminals of a load, and similarly, a series resistance with a resistance value R2 is connected between an output terminal of a second DC/DC converter (output voltage V2) and the terminal of the load.

Then, when a load current Io is equal to or less than a threshold value (V1−V2)/R1, the first DC/DC converter is activated, and an output current I1 is outputted.

On the other hand, when the load current Io is exceeding the threshold value, the first and second DC/DC converters are activated, and the output currents I1 and I2 are outputted.

At this time, a difference between the output currents I1 and I2 becomes reduced as the load current Io increases, and when the load current Io becomes Io=(V1−V2)/(R1−R2), the output currents I1 and I2 become I1=I2.

In the above-mentioned electric power converter, in order to improve the reliability and efficiency of the overall electric power converter, it is desirable to control the output current of DC/DC converters to be as equal as possible.

As a method for controlling the output current value of each DC/DC converter equally, a method is considered on which the first and second DC/DC converters are set to a master and a slave, respectively, and operate the slave based on a current command value sent from the master.

However, when using such a method, when a sudden change in the load faster than a communication speed from the master to the slave occurs, the slave is not able to receive the current command value corresponding to the change in the load in time, thus the current that should be outputted is not outputted.

As a result, when it becomes impossible to correspond to the sudden change in the load only by the master, the electric power converter increases or decreases the output current to increase or lower the output voltage depending on the increase or decrease of the load.

Therefore, there is a problem that the output voltage of the electric power converter changes greatly, and thus the electric power converter cannot output a desired power corresponding to the sudden change in the load.

SUMMARY

An embodiment provides an electric power converter, which has a slave converter operating based on a current command value from a master converter, capable of suppressing an output voltage from suddenly changing.

In electric power converter according to a first aspect, the electric power converter includes a first DC/DC converter and a second DC/DC converter that are connected in parallel with each other, and to a load.

The first DC/DC converter operates having priority over the second DC/DC converter. The second DC/DC converter includes a voltage detecting unit for detecting an output voltage of the electric power converter and a control unit for controlling an output of the second DC/DC converter based on a target command value.

The control unit selects a current command value received from the first DC/DC converter as the target command value when an amount of change per predetermined time of the output voltage detected by the voltage detecting unit is equal to or less than a first threshold value.

The control unit selects a first voltage command value calculated so as to suppress the output voltage from changing as the target command value when the amount of change of the output voltage exceeds the first threshold value.

According to the present disclosure, the first DC/DC converter operates as a master with priority, and the second DC/DC converter operates as a slave. Here, when a sudden load change occurs, the master cannot output a current corresponding to a sudden load change only by itself.

However, when the change speed of the load is faster than a communication speed of the current command value from the master to the slave, the slave is not able to output a current corresponding to a sudden load change if the output of the slave is controlled based on the current command value received from the master.

As a result, the output voltage of the electric power converter changes greatly.

Therefore, when the amount of change per predetermined time of the output voltage is equal to or less than the first threshold value, that is, when no sudden load change is occurring, the output of the slave is controlled based on the current command value received from the master.

In this case, by controlling the slave so as to output the same current as the output current of the master, for example, the electric power converter can be operated with high efficiency.

On the other hand, when the amount of change per predetermined time of the output voltage exceeds the first threshold, that is, when a sudden load change has occurred, the output of the slave is controlled based on the voltage command value calculated by itself so as to suppress the output voltage from changing instead of based on the current command value received from the master.

Therefore, when a sudden load change occurs, the slave switches the control of the output from the current control to the voltage control, for example, and is able to output the current following a sudden load change.

Therefore, in the electric power converter that has the slave operating based on the current command value from the master converter, the output voltage can be suppressed from suddenly changing.

DETAILED DESCRIPTION OF THE PREFERABLE EMBODIMENT

With reference to the drawings, hereinafter will be described an embodiment of the present disclosure.

First, an overall configuration of an electric power system that employs an electric power converter according to the present embodiment is described with reference to FIG. 1.

The electric power system to which the electric power converter according to the present embodiment is applied is assumed to be mounted in an electric vehicle such as a hybrid vehicle.

<The Entire Configuration of the Electric Power System>

Figure 1:
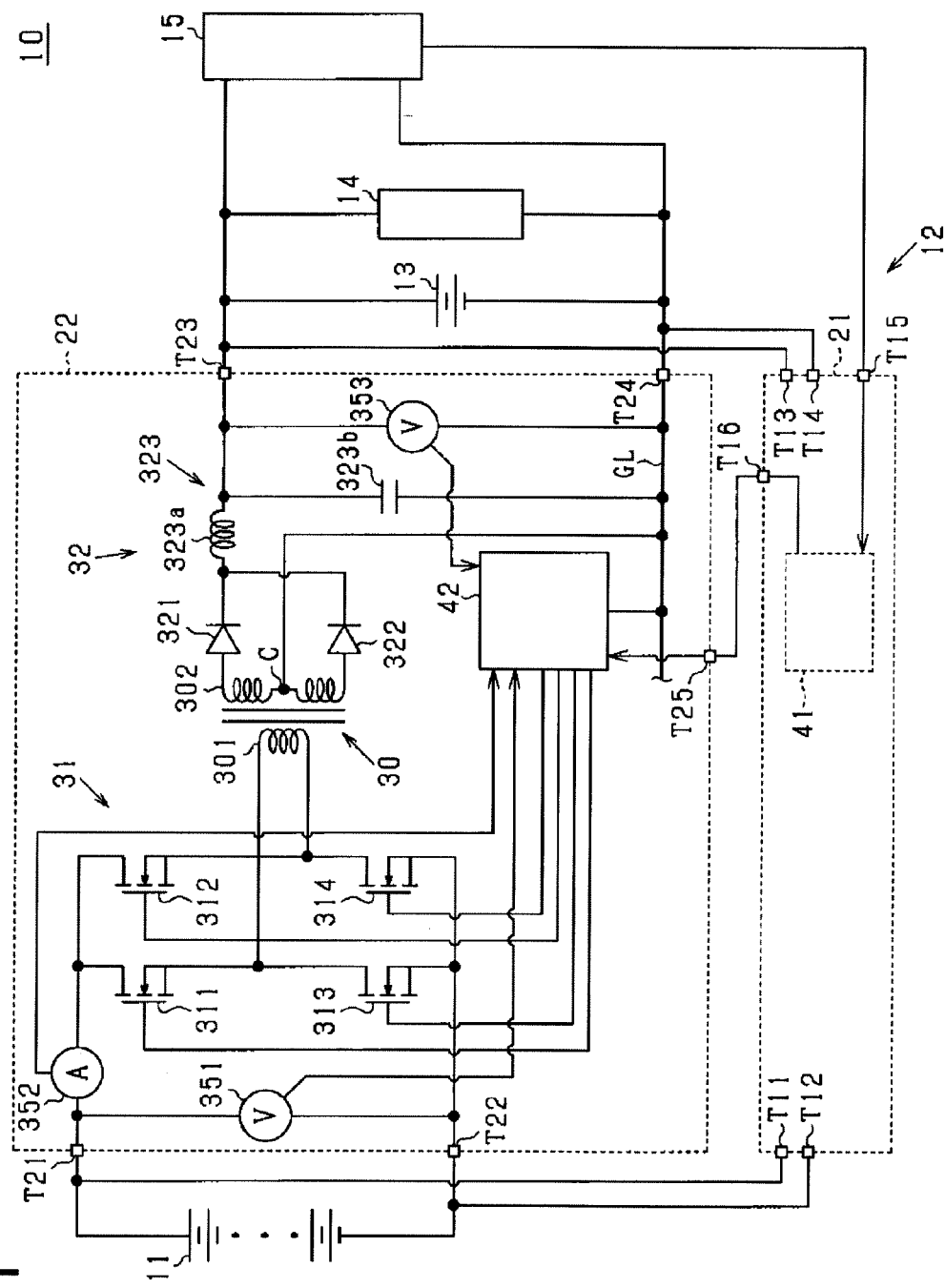
FIG. 1 is a diagram showing a schematic configuration of an electric power system equipped with an electric power converter according to a present embodiment.

An electric power system 10 shown in FIG. 1 is equipped with a high-voltage battery 11, an electric power converter 12, a low-voltage battery 13, a vehicle-mounted load 14, and a vehicle ECU 15.

The high-voltage battery 11 is a DC power source such as a lithium ion secondary battery, and is configured to output a higher output voltage (288V, for example) than an output voltage of the low-voltage battery 13.

The electric power converter 12 is configured to convert the high voltage DC power outputted from the high-voltage battery 11 into a predetermined low voltage DC power (12V, for example).

The electric power converter 12 is equipped with a first converter 21 and a second converter 22 as a first DC/DC converter and a second DC/DC converter that are connected in parallel to each other.

A high-voltage side input terminal T11 of the first converter 21 is connected to a high-voltage side terminal (positive terminal) of the high-voltage battery 11.

Moreover, a low-voltage side input terminal T12 of the first converter 21 is connected to a low-voltage side terminal (negative terminal) of the high-voltage battery 11.

Similarly, a high-voltage side input terminal T21 of the second converter 22 is connected to the high-voltage side terminal of the high-voltage battery 11.

Moreover, a low-voltage side input terminal T22 of the second converter 22 is connected to the low-voltage side terminal of the high-voltage battery 11.

An output side of the electric power converter 12, that is, output sides of the first converter 21 and the second converter 22 are connected in parallel to the low-voltage battery 13, the vehicle-mounted load 14 and the vehicle ECU 15.

Specifically, a high-voltage side output terminal T13 of the first converter 21 and a high-voltage side output terminal T23 of the second converter 22 are connected to high-voltage side terminals of the low-voltage battery 13, the vehicle-mounted load 14 and the vehicle ECU 15.

Similarly, a low-voltage output terminal T14 of the first converter 21 and a low-voltage side output terminal T24 of the second converter 22 are connected to low-voltage side terminals of the low-voltage battery 13, the vehicle-mounted load 14, and the vehicle ECU 15.

The low-voltage battery 13 is a DC power source such as a lead storage battery, and is configured to output a lower output voltage (12V, for example) than the output voltage of the high-voltage battery 11.

The vehicle-mounted load 14 is electrical equipment (an air conditioner, audio equipment, lighting devices, etc.) mounted in the electric vehicle mentioned above, and is provided so as to be driven by the output of the electric power converter 12 and/or the low-voltage battery 13.

The vehicle ECU 15 is an electronic control unit that integrally controls an operation of each unit of the electric vehicle mentioned above (including the electric power converter 12 and the vehicle-mounted load 14), and has a micro-computer including a CPU, a ROM, a RAM and a I/O, etc.

The vehicle ECU 15 is operated by receiving power supply from the low-voltage battery 13. The vehicle ECU 15 calculates an output voltage command value Vc, which is a voltage to be outputted by the electric power converter 12 based on an operating condition of the electric vehicle mentioned above, and outputs the calculated output voltage command value Vc to the electric power converter 12.

<Configuration of the Electric Power Converter>

Next, the configuration of the electric power converter 12 will be described in detail.

The first converter 21 provided in the electric power converter 12 operates having priority over the second converter 22 as a master converter that is higher-ranking than the second converter 22. On the other hand, the second converter 22 mainly operates as a slave converter that is subordinate to the first converter 21.

The first converter 21 has a control input terminal T15 and a control output terminal T16.

The control input terminal T15 is provided so as to receive various control signals outputted from the vehicle ECU 15 (including the voltage command value Vc).

The control output terminal T16 is provided so as to output various control signals to the second converter 22.

In addition, the second converter 22 has a control input terminal T25.

The control input terminal T25 is connected to the control output terminal T16 of the first converter 21.

The second converter 22 is a so-called insulated type DC/DC converter, and is equipped with a transformer 30 a primary-side circuit 31, a secondary-side circuit 32, and a control circuit 41.

The first converter 21 is also a so-called insulated type DC/DC converter, and has the same circuit configuration as that of the second converter 22.

Hereafter, a circuit configuration of the second converter 22 will be described in detail.

It should be noted that the first converter 21 has the same circuit configuration as that of the second converter 22 except that it has the control circuit 41 instead of a control circuit 42.

Thus, a description of the following second converter may appropriately incorporate items from the description of the circuit configuration of the first converter 21 unless technical contradiction occurs.

The primary-side circuit 31 is connected to a primary coil 301 of the transformer 30. On the other hand, the secondary-side circuit 32 is connected to a secondary coil 302 of the transformer 30.

The primary-side circuit 31 is a so-called full-bridge circuit that has four switching elements 311, 312, 313, and 314.

Input terminals of a high potential side (upper arm) of the switching elements 311 and 312 are connected to the high-voltage side terminal of the high-voltage battery 11 via the high-voltage side input terminal T21.

Moreover, output terminals of a low potential side (lower arm) of the switching elements 313 and 314 are connected to the low-voltage side terminal of the high-voltage battery 11 via the low side input terminal T22.

Furthermore, a connecting portion between the switching element 311 and the switching element 313 that are connected in series is connected to one end of the primary coil 301.

Moreover, a connecting portion between the switching element 312 and the switching element 314 that are connected in series is connected to another end of the primary coil 301.

In the present embodiment, the switching elements 311 to 314 are constituted by N-channel MOS transistors.

In each switching element 311-314, a free-wheel diode (not shown) is connected between an input terminal (drain) and an output terminal (source).

In addition, the free-wheel diode may be a parasitic diode of the switching elements 311-314, or may be attached externally to the switching elements 311-314.

The secondary-side circuit 32 has diodes 321 and 322, and a smoothing circuit 323. An anode of the diode 321 is connected to one end of the secondary coil 302. An anode of the diode 322 is connected to another end of the secondary coil 302. A cathode of the diode 321 and a cathode of the diode 322 are shorted together.

Further, a center tap C of the secondary coil 302 is connected to a ground line GL. The ground line GL is connected to the low-voltage side output terminal T24.

The smoothing circuit 323 is a so-called LC filter, and has a reactor 323a and a capacitor 323b. One end of the reactor 323a is connected to the cathodes of the diodes 321 and 322. Another end of the reactor 323a is connected to the high-voltage side output terminal T23.

The capacitor 323b is provided between the other end of the reactor 323a and the ground line GL.

The primary-side circuit 31 is provided with an input voltage sensor 351 and an input current sensor 352. Further, the secondary-side circuit 32 is provided with an output voltage sensor 353 (voltage detecting unit).

The input voltage sensor 351 detects an input voltage of the primary-side circuit 31. The input voltage of the primary-side circuit 31 is an inter-terminal voltage between the high-voltage side input terminal T21 and the low-voltage side input terminal T22.

The input current sensor 352 is a so-called current transformer provided between the high-voltage side input terminal T21 and the input terminal of the switching element 311, and detects an input current flowing into the primary-side circuit 31.

The output voltage sensor 353 detects a slave output voltage Vo2 of the secondary-side circuit 32. The slave output voltage Vo2 of the secondary-side circuit 32 is an inter-terminal voltage between the high-voltage side output terminal T23 and the low-voltage side output terminal T24.

The control circuit 42 (control unit) is an ECU that is lower-ranking than the vehicle ECU 15, and has a microcomputer including a CPU, a ROM, a RAM and a I/O, etc.

A control program for controlling an operation of the electric power system 10, a map (lookup table) that is referred to when running the control program, and etc. are stored in the ROM in advance.

The RAM is capable of temporarily storing data when the CPU is running the above-mentioned control program.

The CPU generates and outputs various control signals by running the above-mentioned control program.

<Operation>

The operation of the electric power converter 12 according to the present embodiment will be described in detail.

The control circuit 41 of the first converter 21 receives the output voltage command value Vc (command value of the output voltage Vo of the electric power converter 12), which is calculated by the vehicle ECU 15 based on the operating condition of the vehicle, from the vehicle ECU 15 via the control input terminal T15.

Further, the control circuit 41 obtains a master input voltage Vi1, a master input current Ii1, and a master output voltage Vo1 detected by an input voltage sensor, an input current sensor, and an output voltage sensor, respectively.

Then, the control circuit 41 generates a PWM control signal, a current command value Ic2, and a voltage command value Vc2 to the gate terminals of the four switching elements based on the received output voltage command value Vc, the obtained master input voltage Vi1, the master input current Ii1, and the master output voltage Vo1.

The voltage command value Vc2 is generated equal to the master output voltage Vo1.

The control circuit 41 PWM-controls the four switching elements based on the PWM control signal. That is, the control circuit 41 feedback-controls the master output voltage Vo1 to be the output voltage command value Vc.

Further, the control circuit 41 transmits the generated current command value Ic2 and the voltage command value Vc2 (second voltage command value) to the second converter 22 via the control output terminal T16.

The control circuit 42 of the second converter 22 obtains a slave input voltage Vi2, a slave input current Ii2, and a slave output voltage Vo2 detected by the input voltage sensor 351, the input current sensor 352, and output voltage sensor 353, respectively.

Moreover, the control circuit 42 receives the current command value Ic2 and the voltage command value Vc2 from the control circuit 41 via the control input terminal T25.

Then, the control circuit 42 selects either one of the current command value Ic2 or a voltage command value Vc2a (first voltage command value) as a target command value, and controls the output of the second converter 22 based on the target command value.

Specifically, the control circuit 42 generates the PWM control signal to the gate terminals of the switching elements 311-314 based on acquired values of the slave input voltage Vi2, the slave input current Ii2 and the slave output voltage Vo2, and the target command value.

Then, the control circuit 42 outputs the PWM control signal to the switching elements 311-314 to PWM-control the switching elements 311-314. Here, the voltage command value Vc2a is a voltage command value calculated based on the voltage command value Vc2.

The control circuit 42 selects the current command value Ic2 as the target command value (current control) during normal operation when no sudden load change is occurring.

That is, the control circuit 42 feedback-controls the slave output current Io2 to be the current command value Ic2 during normal operation.

On the other hand, when a sudden load change is detected, the control circuit 41 switches the target command value from the current command value Ic2 to the voltage command value Vc2a, and sets the voltage command value Vc2a to a target command value (voltage control).

That is, the control circuit 41 feedback-controls the slave output voltage Vo2 to be the voltage command value Vc2a when a sudden load change occurs.

In addition, a sudden load change refers to an increase or decrease of a load current faster than the communication speed from the first converter 21 to the second converter 22.

Next, the current control of the current command value Ic2 to the target command value will be described with reference to FIG. 2.

Figure 2:
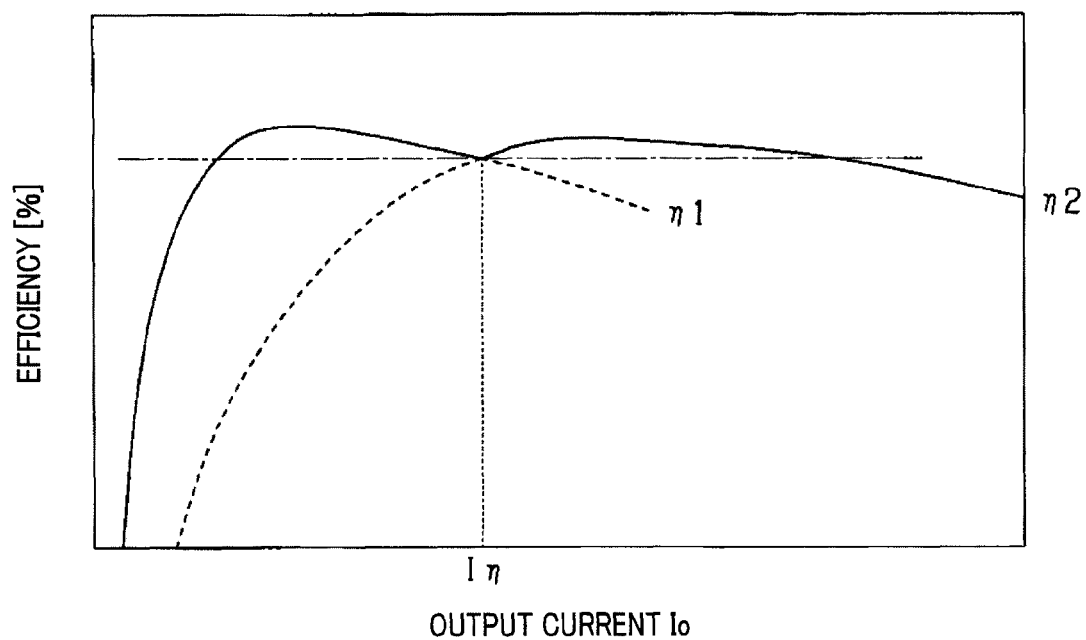
FIG. 2 is a diagram describing an example of operation of the electric power converter according to the present embodiment.

Here, η1 in FIG. 2 is a graph showing a relationship between the output current Io flowing through the load and a power conversion efficiency in a case where only the first converter 21 allowed to operate power conversion (slave stop mode).

In addition, η2 is a graph showing the relationship between the output current Io and the power conversion efficiency in a case where the first converter 21 and the second converter 22 are allowed to perform power conversion so that both output currents become the same (Io1=Io2=Io/2: slave operation mode).

In addition, Iη is an output current Io corresponding to an intersection of a curve η1 and a curve η2. Note that Io1 is a master output current and Io2 is a slave output current, and a relationship Io=Io1+Io2 is satisfied.

When in the case where the output current Io is equal to or less than Iη, the control circuit 41 allows only the first converter 21 to operate power conversion by setting the current command value Ic2 to 0 (zero).

On the other hand, when in the case where the output current Io exceeds Iη, the control circuit 41 allows the first converter 21 and the second converter 22 to operate power conversion of by setting the current command value Ic2 to Io/2=Io1.

During the slave stop mode, the control circuit 41 switches the operation mode of the electric power converter 12 from the slave stop mode to the slave operation mode when an acquired value Is of the master input current Ii1 exceeds a predetermined value Ith1.

Further, during the slave operation mode, the control circuit 41 switches the operation mode of the electric power converter 12 from the slave operation mode to the stop slave mode when the above-mentioned acquired value Is is equal to or less than a predetermined value Ith2.

Here, the predetermined values Ith1 and Ith2 are set respectively as the following: Ith1=(Iη+α)/η, Ith2=(Iη−α)/(2n). Here, α indicates a predetermined value (α>0), and n indicates a turn ratio of the transformer 30.

That is, the control circuit 41 switches the operation mode from the slave stop mode to the slave operation mode when the output current Io reaches Iη+α from equal to or less than Iη.

Further, the control circuit 41 switches the operation mode from the slave operation mode to the slave stop mode when the output current Io reaches Iη−α from more than Iη. Thus, a hysteresis characteristic is given to the switching of the operation modes.

Next, a switching of the target command value by the control circuit 42 will be explained.

Figure 3:
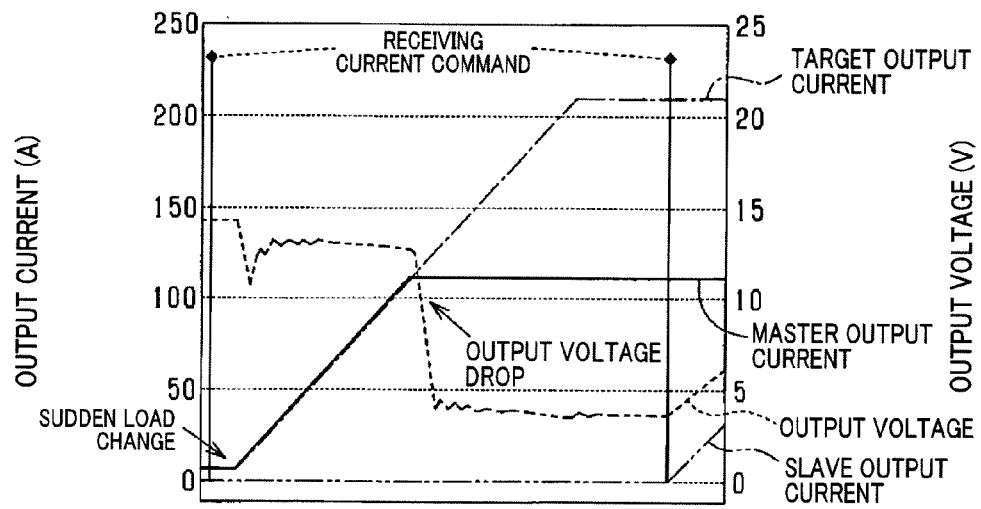
FIG. 3 is a diagram showing a time variation of an output of the electric power converter according to the present embodiment in a case where current control is performed during a sudden load change.

FIG. 3 is a graph showing a simulation result of a time variation of the target output current, the output voltage Vo, the master output current Io1, and the slave output current Io2 when a sudden load increase occurs during the current control of the slave stop mode.

As shown in FIG. 3, after the second converter 22 receives the current command value Ic2, and before receiving the next current value Ic2, a sudden load increase has occurred.

Such a sudden load increase occurs when blinking headlights for passing, when using stationary power-steering, or when an ABS (Antilock Brake System) is operating.

When a sudden load increase occurs, the target output current suddenly increases. Along with it, the master output current Io1 suddenly increases and reaches to a maximum output current.

Although the output voltage Vo is once recovered after an undershoot following a sudden load increase by a change of the output voltage Vo being fed back, the output voltage Vo gradually drops, and greatly drops when the master output current Io1 becomes a maximum current.

Then, when the second converter 22 receives the current command value Ic2 corresponding to a sudden load increase, and the slave output current Io2 begins to increase, the output voltage Vo also begins to rise. Note that the output voltage Vo is a voltage applied to the vehicle-mounted load 14.

During a period from when the load starts to increase suddenly until the second converter 22 receives the current command value Ic2 corresponding to a sudden load increase, only the first converter 21 must output a current that corresponds to a sudden load increase.

Therefore, a decrease in the output voltage Vo occurs when attempting to increase the master output current Io1 further from a condition where the output power of the first converter 21 becomes the maximum output power.

Moreover, since the output current Io never becomes greater than the maximum value of the master output current Io1 until the slave output current Io2 begins to increase, the output current Io and the target output current become deviated from suitable values.

Such a problem is due to a delay from a start of a sudden load change until the second converter 22 receives the current command value Ic2 corresponding to a sudden load change.

Such a problem similarly occurs also when a sudden load increase during the current control of the slave operation mode occurs.

Moreover, when a sudden load decrease during the current control of the slave operation mode occurs, a current larger than the target output current flows into the load during a period from a start of a sudden load decrease until the second converter 22 receives the current command value Ic2 corresponding a sudden load decrease.

Therefore, when a sudden load decrease occurs, the output voltage Vo overshoots. In other words, when a sudden load change occurs, the output voltage Vo changes greatly.

Then, the control circuit 42 of the second converter switches the target command value to the voltage command value Vc2a calculated so as to suppress the slave output voltage Vo2 from changing when detecting a change in the slave output voltage Vo2 following a sudden load change.

Specifically, the control circuit 42 calculates a value having a predetermined difference (for example 0.5v) with respect to the most recent voltage command value Vc2 as the voltage command value Vc2a among the voltage command value Vc2 received from the first converter 21.

In the present embodiment, a voltage value lower than the voltage command value Vc2 for a predetermined deviation is configured to be a command value Vc2a.

Due to a communication delay between the converters, the most recent voltage command value Vc2 that the second converter 22 has becomes a value generated equal to the master output voltage Vo1 generated once before the present master output voltage Vo1.

For that reason, when the voltage command value Vc2 and the voltage command value Vc2a are set to be equal, there is a possibility that the master output voltage Vo1 and the slave output voltage Vo2 are repeatedly reversed when the master output voltage Vo1 increases or decreases in random.

Therefore, a predetermined deviation is set between the voltage command value Vc2 and the voltage command value Vc2a. Note that since the first converter 21 and the second converter 22 are connected in parallel with each other relative to the load, the change of the output voltage Vo appears as a change in the slave output voltage Vo2.

In general, the voltage command value is set to a substantially constant value in the DC/DC converter even if the load suddenly changes.

A control cycle of the voltage command value is longer than a control cycle of the current command value.

Therefore, the output voltage command value Vc transmitted from the vehicle ECU 15 to the first converter 21 is a substantially equal value before and after the start of a sudden load change.

Similarly, the voltage command value Vc2 transmitted from the first converter 21 to the second converter 22 is a substantially equal value before and after the start of a sudden load change.

Therefore, the control circuit 42 may calculate the voltage command value Vc2a based on the voltage command value Vc2 received before a sudden load change without problems.

The control circuit 42 outputs the slave output current Io2 corresponding to a sudden load change by feedback-controlling the slave output voltage Vo2 to be the voltage command value Vc2a.

Figure 4:
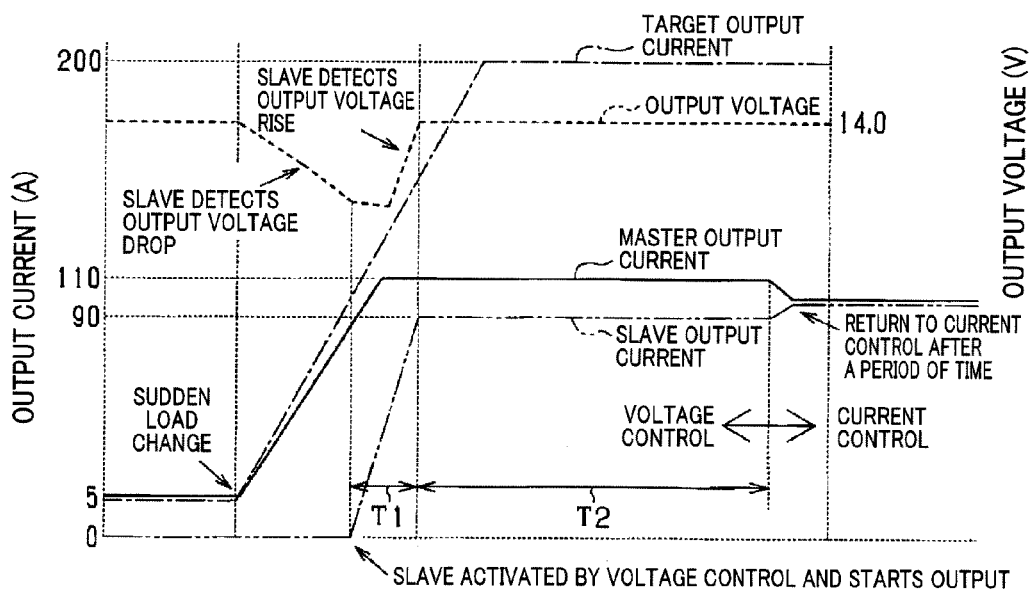
FIG. 4 is a diagram showing a time variation of the output of the electric power converter according to the present embodiment in a case where voltage control is performed during a sudden load change.

FIG. 4, is a graph showing an outline of a time variation of the target output current, the output voltage Vo, the master output current Io1, and the slave output current Io2 when the second converter 22 is switched to the voltage control after a sudden load increase has started during the current control of the slave stop mode.

As shown in FIG. 4, the control circuit 42 activates the second converter 22 by setting the target command value to the voltage command value Vc2a (13.5V, for example) when a decrease of the slave output voltage Vo2 following a sudden load increase is detected.

That is, the control circuit 42 increases the output current Io2 slave from 0 by operating the switching elements 311-314 with the voltage control.

When the slave output current Io2 increases, the output voltage Vo that has dropped following a sudden load change is increasing.

Furthermore, when the sum of the slave output current Io2 and the master output current Io1 becomes the target output current, the slave output current Io2 becomes constant, while the of the output voltage Vo is settled. That is, the first converter 21 and the second converter 22 can stably output the target output current despite a sudden load increase.

In the present embodiment, since the voltage command value Vc2a to the second converter 22 is lower than the output voltage command value Vc to the first converter 21, the slave output current Io2 becomes smaller than the master output current Io1.

In addition, when the voltage command value Vc2a is set higher than the output voltage command value Vc, the slave output current Io2 becomes larger than the master output current Io1.

Further, in order to bring the output current Io to the target output current steeply, the control circuit 42 controls the output of the second converter 22 using a larger control gain than that of other periods during a period from switching the target command value to the voltage command value Vc2a until a period T1 (first period) has passed.

The control gain is a so-called feedback gain. The control gain larger than the other periods has a size that the slave output voltage Vo2 overshoots when used other than when a sudden load change occurs.

Accordingly, an increasing speed of the slave output current Io2 becomes faster than an increasing speed of the master output current Io1.

Although a responsiveness of the output of the electric power converter 12 relative to a sudden load change becomes higher by switching the target command value to the voltage command value Vc2a, the efficiency of the electric power converter 12 is deteriorated.

Then, in order to minimize the deterioration in efficiency of the electric power converter 12, the control circuit 42 switches the target command value to the voltage command value Vc2a at a point where a period T2 (second period) elapsed after the change in the slave output voltage Vo2 is settled after the target command value is switched to the current command value Ic2.

That is, the control circuit 42 switches to the efficient current control (Io1=Io2=Io/2) after the output of the electric power converter 12 becomes stable and the period T2 has elapsed.

Moreover, when the load is decreased suddenly during the operation of the second converter 22, the second converter 22 outputs a current corresponding to the load prior to the sudden decrease until the target command value changes.

Therefore, the electric power converter 12 results in outputting a current larger than the load, thus the output voltage Vo rises suddenly.

Then, when the sudden decrease of the load during the current control of the slave operation mode occurs, and the slave output voltage Vo2 increases suddenly, the control circuit 42 stops the operation of the switching elements 311-314, and stops the output from the second converter 22.

Alternatively, in this case, the control circuit 42 may operate the switching elements 311-314 so as to lower the output current Io2 of the second converter 22.

Figure 5:
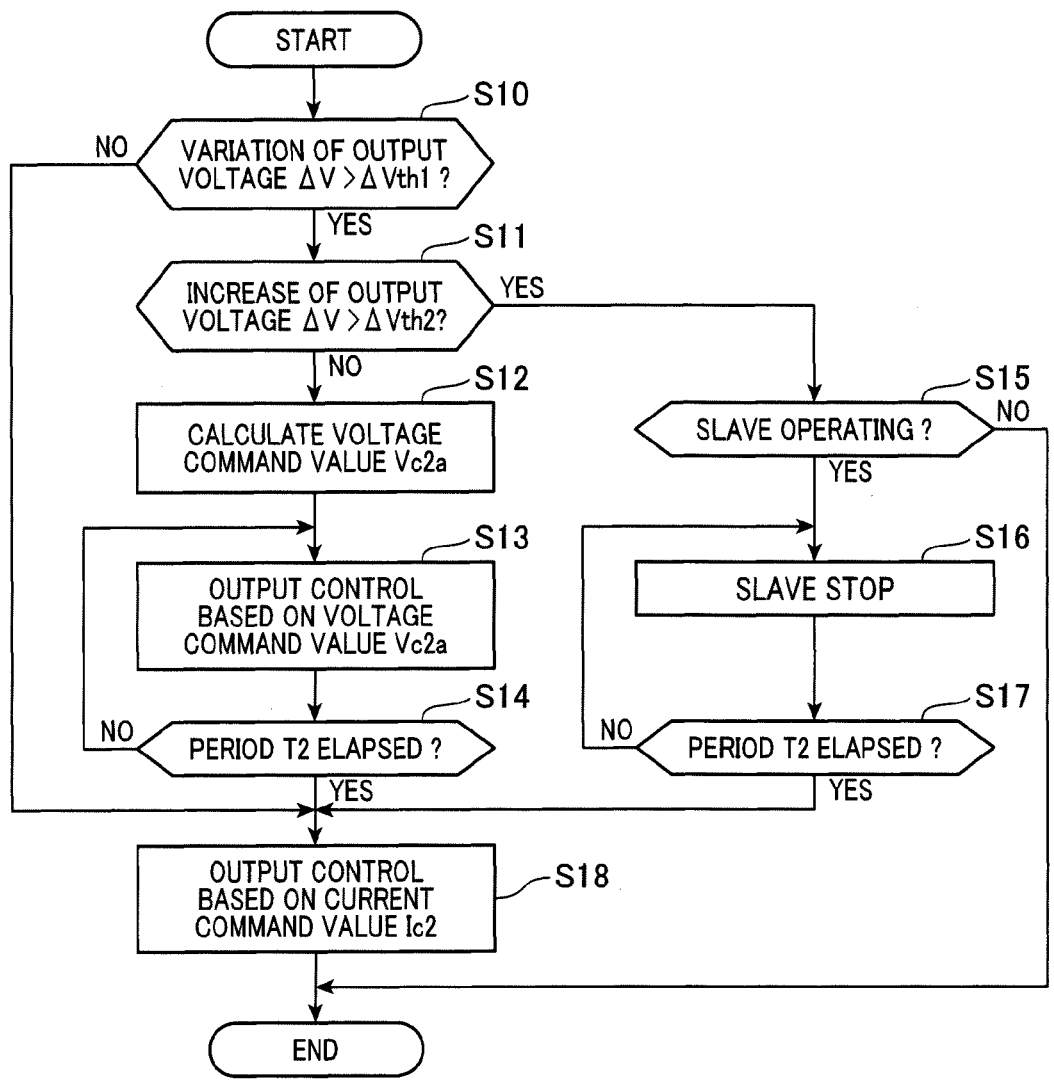
FIG. 5 is a flowchart showing processing procedures of output control of a slave that the electric power converter according to the present embodiment has.

Next, the output control of the second converter 22 will be described with reference to the flowchart of FIG. 5. The control circuit 42 repeatedly executes the present output control.

First, a variation ΔV per predetermined time of the slave output voltage Vo2 is determined whether or not a variation ΔVth1 (first threshold value) is exceeded (S10). In other words, it is determined whether or not the change in the slave output voltage Vo2 following a sudden load change is occurring.

If the variation ΔV is equal to or less than the variation ΔVth1 (S10: NO), the output control of the second converter 22 is performed using the current command value Ic2 as the target command value (S18).

On the other hand, if the variation ΔV exceeds the variation ΔVth1 (S10: YES), then, it is determined whether an increase ΔV per predetermined time of the slave output voltage Vo2 exceeds an increase ΔVth2 (second threshold value) (S11). In other words, it is determined whether or not the change in the slave output voltage Vo2 following a sudden load decrease is occurring.

The increase ΔVth2 may be a value equal to the variation ΔVth1, or may be a value greater than the variation ΔVth1.

If the increase ΔV is less that the increase ΔVth2 (S11: NO), the voltage command value Vc2a is calculated based on the voltage command value Vc2 that has been received from the first converter 21 (S12).

As for such a case, a case where a drop of the slave output voltage Vo2 following a sudden load increase is occurring, or a case where a rise of the slave output voltage Vo2 equal to or less than the increase ΔVth2 per predetermined time is occurring, is included.

Subsequently, the output control of the second converter 22 is performed using the voltage command value Vc2a as the target command value (S13).

Subsequently, it is determined whether the period T2 has elapsed after the variation ΔV per predetermined time of the slave output voltage Vo2 becomes equal to or less than the variation ΔVth1 (S14).

That is, it is determined whether or not the period T2c has elapsed after the change of the slave output voltage Vo2 is settled.

If the period T2 has not elapsed (S14: NO), the process returns to S13.

If the period T2 has elapsed (S14: YES), the output control of the second converter 22 is performed using the current command value Ic2 as the target command value (S18).

If the increase ΔV per predetermined time of the slave output voltage Vo2 exceeds the increase limit ΔVth2 (S11: YES), it is determined whether or not the switching elements 311-314 of the second converter 22 are operating (S15).

If the second converter 22 is stopped (S15: NO), that is, when only the first converter 21 is operating, the present process ends as it is.

In this case, the control circuit 41 of the first converter 21 performs the process of suppressing the master output voltage Vo1 from the sudden increase.

On the other hand, if the second converter 22 is operating (S15: YES), the switching elements 311-314 of the second converter 22 is stopped immediately, and stops the output of the second converter 22 (S16).

Alternatively, without stopping the switching elements 311-314, the switching elements 311-314 may be operated so as to lower the output current Io2 of the second converter 22. As a result, the slave output voltage Vo2 is suppressed from rising.

Subsequently, it is determined whether or not the period T2 has elapsed after the variation ΔV per predetermined time of the slave output voltage Vo2 becomes equal to or less than the variation ΔVth1 (S17).

If the period T2 has not elapsed (S17: NO), the process returns to S16.

If that period T2 has elapsed (S17: YES), the output control of the second converter 22 is performed using the current command value Ic2 as the target command value (S18).

With the above, the present processing is finished.

According to the present embodiment mentioned above, the following effects are performed.

When the variation ΔV per predetermined time of the slave output voltage Vo2 is less that the variation ΔVth1, the output of the second converter 22 is controlled based on the current command value Ic2 received from the first converter 21. In this case, it is possible to operate the electric power converter 12 with high efficiency.

On the other hand, when the variation ΔV per predetermined time of the slave output voltage Vo2 exceeds the variation ΔVth1 following a sudden load change, the output of the second converter 22 is controlled based on the voltage command value Vc2a calculated by itself so as to suppress the slave output voltage Vo2 from changing.

Therefore, when a sudden load change occurs, the second converter 22 can output the slave output current Io2 following a sudden load change by switching the target command value from the current command value Ic2 to the voltage command value Vc2a.

As a result, in the electric power converter 12 with the slave that operates based on the current command value Ic2 from the master, it is possible to suppress the output voltage Vo from suddenly changing.

If the increase ΔV per predetermined time of the slave output voltage Vo2 exceeds the increase Vth2 following a sudden load decrease during the operation of the second converter 22, the output from the second converter 22 is stopped.

Alternatively, the output current Io2 of the second converter 22 is lowered. This makes it possible to protect the load by suppressing the output voltage Vo from increasing.

When a sudden load change occurs, the control circuit 42 of the second converter 22 can calculate the voltage command value Vc2a for operating itself based on the voltage command value Vc2 received from the first converter 21.

Thereby, although there is a possibility that the efficiency of the electric power converter 12 is dropped compared with a case where the second converter 22 operates based on the current command value Ic2, the second converter 22 can output the slave output current Io2 corresponding to a sudden load change.

Thus, the electric power converter 12 can output a desired power corresponding to a sudden load change.

By the output voltage command value Vc for the first converter 21 and the voltage command value Vc2a with respect to the second converter 22 having a predetermined deviation, the master output voltage Vo1 and the slave output voltage Vo2 are suppressed from repeatedly reversing when the master output voltage Vo1 increases or decreases randomly.

In a period until the period T1 elapses after the target command value is switched from the current command value Ic2 to the voltage command value Vc2a, it is possible to increase the responsiveness of the output current Io relative to a sudden load change by using the larger control gain than during the other periods.

Although the responsiveness to a sudden load change becomes higher and the output voltage Vo of the electric power converter 12 becomes stable by switching the target command value from the current command value Ic2 to the voltage command value Vc2a, there is a possibility that the efficiency of the electric power converter 12 may be deteriorated.

Therefore, the target command value is switched to the current command value Ic2 after the output voltage Vo of the electric power converter 12 becomes stable and the period T2 has elapsed.

In this way, it is possible to suppress the efficiency of the electric power converter 12 from dropping to a minimum by controlling the master output current Io1 and the slave output current Io2 to be equal.

Other Embodiments

The output voltage command value Vc from the vehicle ECU 15 may be sent not only to the first converter 21, but also to the second converter 22.

The control circuit 42 of the second converter 22 may calculate the voltage command value Vc2a based on the output voltage command value Vc received from the vehicle ECU 15.

The current command value Ic2 is not limited to those generated so as the master output current Io1 and the slave output current Io2 to be equal.

Even when the second converter 22 is current-controlled based on the current command value Ic2 generated so as the master output current Io1 and the slave output current Io2 be a different value, the output voltage Vo can be suppressed from changing by switching to the voltage control when a sudden load change occurs.

Although there is a possibility that the master output voltage Vo1 and the slave output voltage Vo2 are repeatedly reversed, the control circuit 42 may set the latest voltage command value Vc2 currently received to the voltage command value Vc2a.

Switching elements may be provided instead of the diodes 321 and 322 of the secondary-side circuit 32. That is, the secondary-side circuit 32 of the first converter 21 and second converter 22 may be a so-called synchronous rectification circuit.

The input current sensor 352 may be provided to the low-voltage side input terminal T12 side, or may be provided between the primary-side circuit 31 and the primary coil 301.

Figure 6:
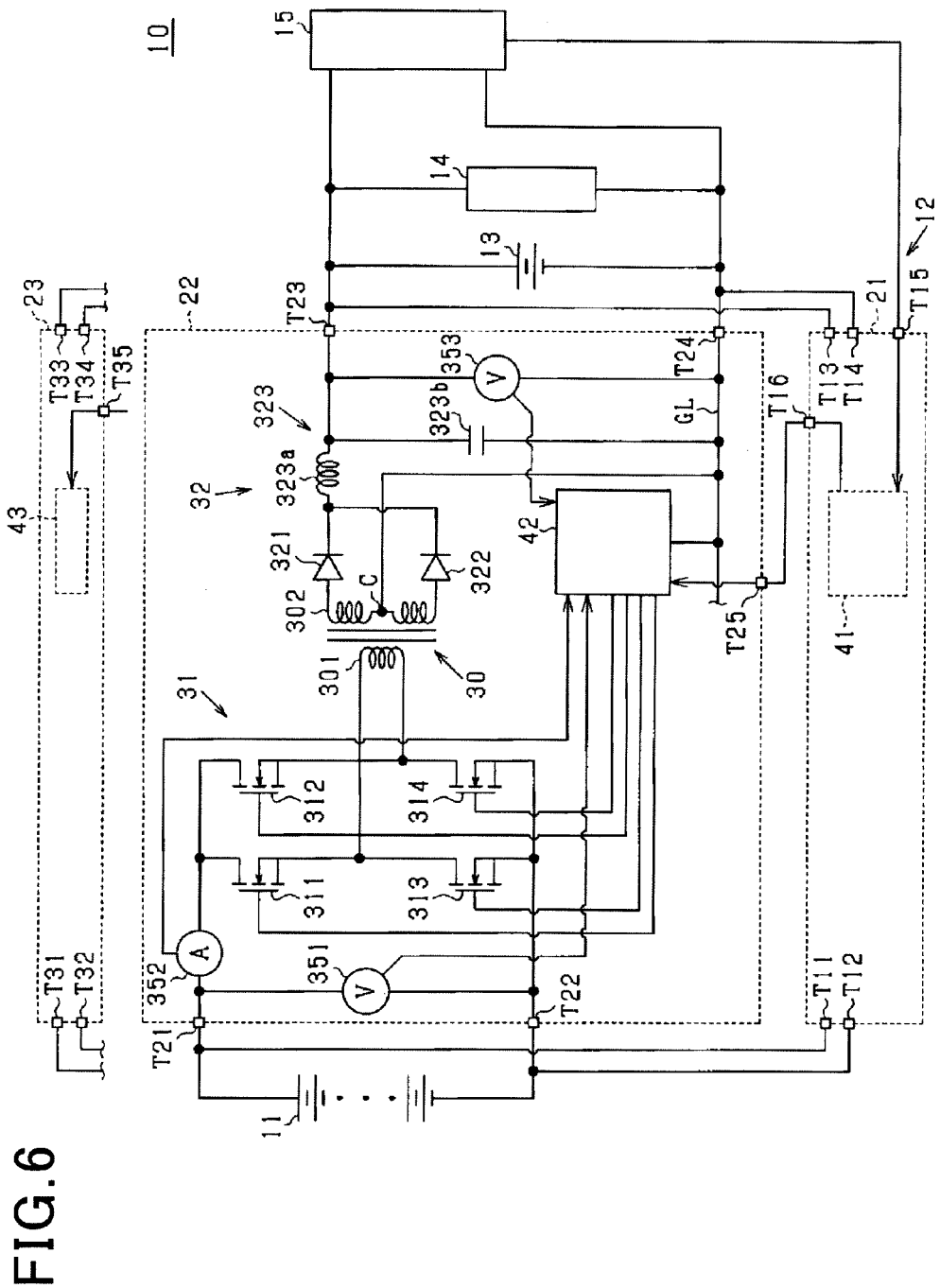
FIG. 6 is a diagram showing a schematic configuration of an electric power system comprising an electric power converter according to another embodiment.

The electric power converter 12 may be provided with three or more DC/DC converters connected in parallel to the load. For example, as shown in FIG. 6, the electric power converter 12 may be a parallel connected unit of a first converter 21, a second converter 22, and a third converter 23.

In this case, the third converter 23 becomes a slave that is configured similarly to the second converter 22.

Moreover, when only the first converter 21 is operating, and when a sudden load increase occurs, the second converter 22 and third converter 23 may be activated by the voltage control, or only one of them may be activated by the voltage control.

Furthermore, when all of the converters are operating, and when a sudden load decrease occurs, at least one of the second converter and the third converter 23 may be stopped, or the output current of at least one of the second converter and the third converter may be lowered.

It is in the same manner for the electric power converter having more than three DC/DC converters connected in parallel.

What is claimed is:

1. An electric power converter comprising:
a first DC/DC converter and a second DC/DC converter that are connected in parallel with each other, and to a load; wherein,
the first DC/DC converter operates having priority over the second DC/DC converter;
the second DC/DC converter includes a voltage detecting unit for detecting an output voltage of the electric power converter and a control unit for controlling an output of the second DC/DC converter based on a target command value; wherein,
the control unit selects a current command value received from the first DC/DC converter as the target command value when an amount of change per predetermined time of the output voltage detected by the voltage detecting unit is equal to or less than a first threshold value; and
the control unit selects a first voltage command value calculated so as to suppress the output voltage from changing as the target command value when the amount of change of the output voltage exceeds the first threshold value.

2. The electric power converter according to claim 1, wherein,
the control unit stops an output from the second DC/DC converter when an amount of increase per predetermined time of the output voltage detected by the voltage detecting unit exceeds a second threshold during operation of the second DC/DC converter.

3. The electric power converter according to claim 1, wherein,
the control unit calculate the first voltage command value based on the most recent second voltage command value that is a voltage command value received from the first DC/DC converter.

4. The electric power converter according to claim 3, wherein,
the second voltage command value is an output voltage of the first DC/DC converter; and
the control unit calculates a value having a predetermined difference with respect to the second voltage command value as the first voltage command value.

5. The electric power converter according to claim 1, wherein,
the control unit controls the output of the second converter DC/DC using a larger control gain than that of other periods during a period from switching the target command value to the first voltage command value until a first period has passed.

6. The electric power converter according to claim 1, wherein,
the current command value is a value equal to a current flowing in the first DC/DC converter; and
the control unit switches the target command value current to the command value at a point where a second period has elapsed after the change of the output voltage becomes lower than the first threshold value after switching the target command value to the first voltage command value.

* * * * *